(12) United States Patent
Yamazaki

(10) Patent No.: US 7,641,581 B2
(45) Date of Patent: Jan. 5, 2010

(54) DIFFERENTIAL DEVICE

(75) Inventor: Nobushi Yamazaki, West Bloom Field, MI (US)

(73) Assignee: GKN Driveline Torque Technology KK, Tochigi-Shi (JP)

( * ) Notice: Subject to any disclaimer, the term of this patent is extended or adjusted under 35 U.S.C. 154(b) by 370 days.

(21) Appl. No.: 11/823,715

(22) Filed: Jun. 27, 2007

(65) Prior Publication Data

US 2008/0004152 A1 Jan. 3, 2008

(30) Foreign Application Priority Data

Jun. 30, 2006 (JP) .............................. 2006-181936

(51) Int. Cl.
*F16H 48/30* (2006.01)
*F16H 57/04* (2006.01)
(52) U.S. Cl. ..................................... 475/252; 74/606 R
(58) Field of Classification Search ................. 475/248, 475/252, 338, 339, 331; 74/606 R
See application file for complete search history.

(56) References Cited

U.S. PATENT DOCUMENTS 806,021 A * 11/1905 Symmonds ................. 475/252
3,939,736 A * 2/1976 Morin ......................... 475/338
5,507,703 A * 4/1996 Madsack et al. ............ 475/248
5,823,907 A * 10/1998 Teraoka et al. .............. 475/248
5,879,262 A * 3/1999 Ikeda et al. ................. 475/248
2005/0164823 A1* 7/2005 Huber et al. ................ 475/331

FOREIGN PATENT DOCUMENTS

JP 07-077263 3/1995

* cited by examiner

*Primary Examiner*—Roger Pang
(74) *Attorney, Agent, or Firm*—Morrison & Foerster LLP

(57) ABSTRACT

A differential device is provided with a case rotatable about an axis; an input member configured to receive the torque from the input shaft, the input member being housed in the case and including an engaging outer periphery drivingly engaged with the case; first and second output gears configured to respectively drivingly link with the output shafts, the first and second output gears being rotatably housed in the case to form a row with the input member along the axis; one or more first pinions being rotatably housed in the case in parallel with the axis and meshing with the first output gear, the first pinions having no overlap with the engaging outer periphery of the input member and the second output gears; and one or more second pinions being rotatably housed in the case in parallel with the axis and meshing with the second output gears and the first pinions, the second pinions extending beyond the input member to reach the first pinions.

8 Claims, 9 Drawing Sheets

DIFFERENTIAL DEVICE

CROSS-REFERENCE TO RELATED APPLICATIONS

This application is based upon and claims the benefit of priority from the prior Japanese Patent Applications No. 2006-181936 (filed Jun. 30, 2006); the entire contents of which are incorporated herein by reference.

BACKGROUND OF THE INVENTION

1. Field of the Invention

The present invention relates to a differential device applied to conveyance means such as automobiles.

2. Description of the Related Art

As is known, a driveline of an automobile requires one or more differential assemblies for differentially distributing torque generated by an engine to a plurality of shafts and axles, each of which facilitates relative rotation between a pair of output shafts. One type of differentials is known as a parallel axis helical gear differential, which is provided with a planetary gear set typically having helical output gears and paired sets of helical pinion gears.

Japanese Patent Application Laid-open No. H07-77263 (in particular, FIG. 3) discloses an art of a parallel axis helical gear differential, in which a central piece receives torque from an engine and the received torque is distributed to left and right follower gears via a differential case and paired sets of pinion gears. In each pair of the pinions, one pinion meshes with the left follower gear and another pinion meshes with the right follower gear. For mutual meshing of the pinion gears, both the pinions are extended toward a center in the axial direction of the differential case and have overlaps around the central piece.

SUMMARY OF THE INVENTION

The central piece needs to have rigid engagement with the differential case so as to transmit the torque to the differential case. The overlaps of the pinion gears limit a structure and dimensions of the engagement between the central piece and the differential case. Engaging portions of the central piece and the differential case must be so designed as to avoid the overlaps and are therefore difficult to be formed all around the central piece. In other words, as the engaging portions are limited, this structural and dimensional restriction leads to a difficulty in transmission of relatively great torque.

The present invention has been achieved to overcome the aforementioned problem.

According to a first aspect of the present invention, a differential device is used for differentially transmitting torque from an input shaft to a pair of output shafts. The differential device is provided with: a case rotatable about an axis; an input member configured to receive the torque from the input shaft, the input member being housed in the case and including an engaging outer periphery drivingly engaged with the case; first and second output gears configured to respectively drivingly link with the output shafts, the first and second output gears being rotatably housed in the case to form a row with the input member along the axis; one or more first pinions being rotatably housed in the case in parallel with the axis and meshing with the first output gear, the first pinions having no overlap with the engaging outer periphery of the input member and the second output gears; and one or more second pinions being rotatably housed in the case in parallel with the axis and meshing with the second output gears and the first pinions, the second pinions extending beyond the input member to reach the first pinions.

Preferably, the case is provided with a first end wall, which the input shaft and one of the output shafts penetrate, and a second end wall axially opposite to the first end wall, which another of the output shafts penetrates. More preferably, the input member is interposed between and supported by the output gears supported by the first and second end walls.

Preferably, the case is provided with a case body configured to rotatably support outer peripheries of the first and second pinions, a first end wall, a second end wall axially opposite to the first end wall, and one or more bolts fixing the first and second end walls to the case body, the pinions are arranged around outer peripheries of the output gears, and the bolts are disposed in a circumferential direction of the pinions.

According to a second aspect of the present invention, a differential device is used for differentially transmitting torque from an input shaft to a pair of output shafts. The differential device is provided with: a case being rotatable about an axis and having a first end perpendicular to the axis and a second end axially opposite to the first end; a central bore defined in the case along the axis, the central bore including an engaging internal periphery; one or more first bores extending from the first end in parallel with the axis and being short of the engaging internal periphery; one or more second bores extending from the first end to the second end in parallel with the axis; an input member configured to receive the torque from the input shaft, the input member being housed in the central bore and including an engaging outer periphery engaged with the engaging inner periphery of the central bore; first and second output gears configured to respectively drivingly link with the output shafts, the first and second output gears being rotatably housed in the central bore to form a row with the input member along the axis; one or more first pinions being respectively rotatably housed in the first bores and meshing with the first output gear; and one or more second pinions being respectively rotatably housed in the second bores and meshing with both the first pinions and the second output gear.

Preferably, the case is provided with a first end wall to cover the first end, which the input shaft and one of the output shafts penetrate, and a second end wall to cover the second end, which another of the output shafts penetrates. More preferably, the first and second end walls support the row of the first output gear, the input member and the second output gear.

Preferably, the case is provided with a case body configured to rotatably support outer peripheries of the first and second pinions, a first end wall, a second end wall axially opposite to the first end wall, and one or more bolts fixing the first and second end walls to the case body, the pinions are arranged around outer peripheries of the output gears, and the bolts are disposed in a circumferential direction of the pinions.

DETAILED DESCRIPTION OF THE PREFERRED EMBODIMENT

Certain embodiments of the present invention will be described hereinafter with reference to the appended drawings.

Figure 14:
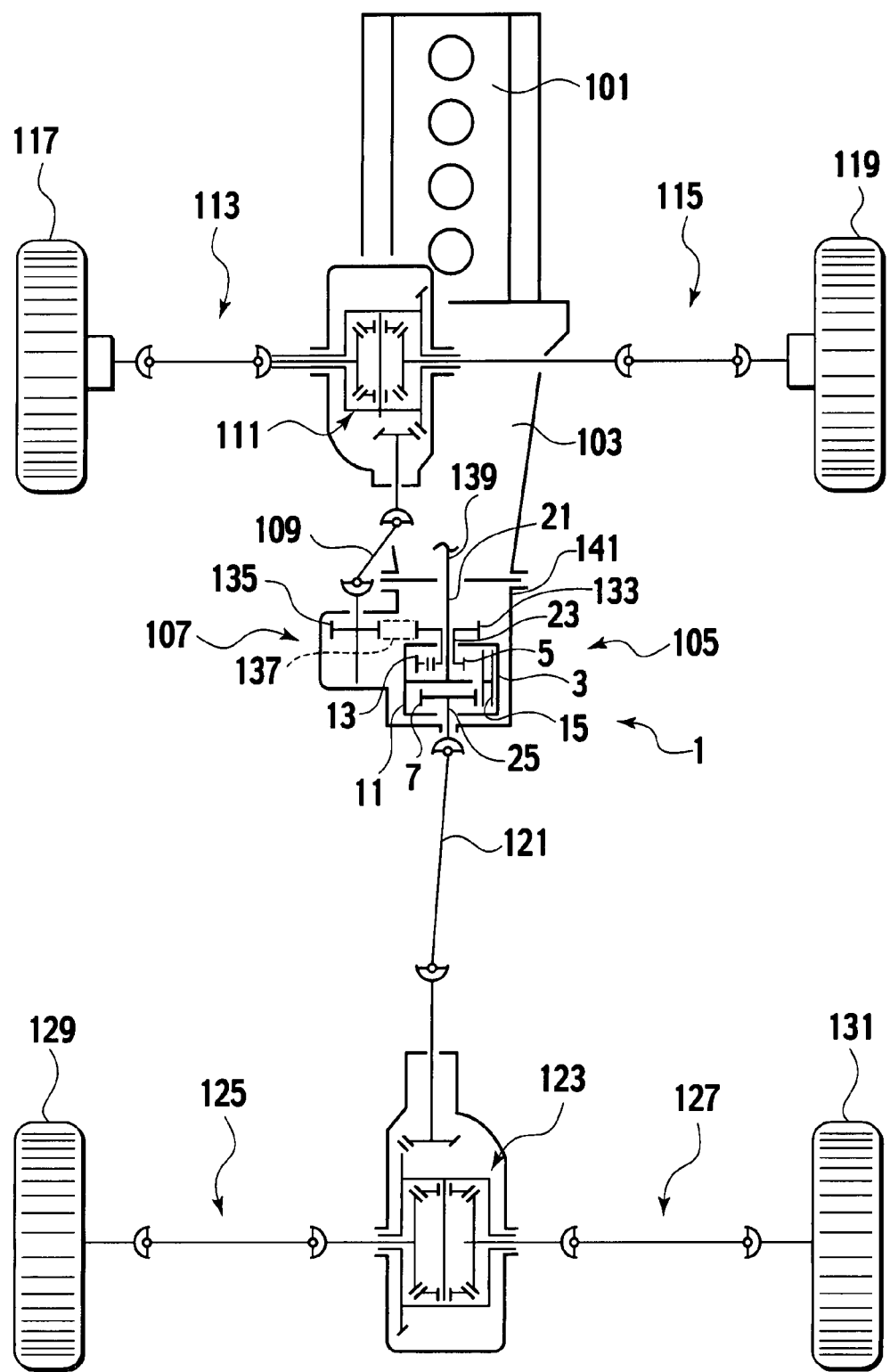
FIG. 14 is a schematic view of a drive train of an exemplary automobile to which the differential device in accordance with the first embodiment is applied as a center differential.

In the following description, a differential device is employed as, but not limited to, a center differential of a drive train of an exemplary 4WD automobile. FIG. 14 schematically shows such a drive train.

The drive train is provided with a transmission 103 for transmission of torque generated by an engine 101 of the automobile to a transfer 105 via an output shaft 139 of the transmission 103. The transfer 105 is coupled with a front propeller shaft 109 and a rear propeller shaft 121 to distribute the torque to the propeller shafts 109 and 121. The torque distributed to the front propeller shaft 109 drives a front differential 111 to drive left and right front axles 113 and 115 respectively coupled with left and right front wheels 117 and 119. Similarly, the torque distributed to the rear propeller shaft 121 drives a rear differential 123 to drive left and right rear axles 125 and 127 respectively coupled with left and right rear wheels 129 and 131.

The transfer 105 is provided with an input shaft 21 linked with the output shaft 139 of the transmission 103, a center differential, to which the differential device 1 of the first embodiment is applied, and a chain link 107 both housed in a transfer case 141. The differential device 1 is disposed so as to have its axis directed to a longitudinal direction of the automobile and supported by the transfer case 141 to be rotatable about the axis. The differential device 1 is to allow differential in rotation speeds between the front propeller shaft 109 and the rear propeller shaft 121 while the differential device 1 is distributing the torque thereto. The differential device 1 is drivingly coupled with the output shaft 139 of the transmission 103 via an input shaft. The differential device 1 is coupled with a pair of output shafts 23 and 25. The output shaft 23 is made to be a hollow cylinder so as to allow coaxial arrangement with the input shaft 21. The output shaft 23 is provided with a sprocket 133 to link with a sprocket 135 via a chain 137 of the chain link 107. The output shaft 25 is linked with the propeller shaft 121.

Figure 1:
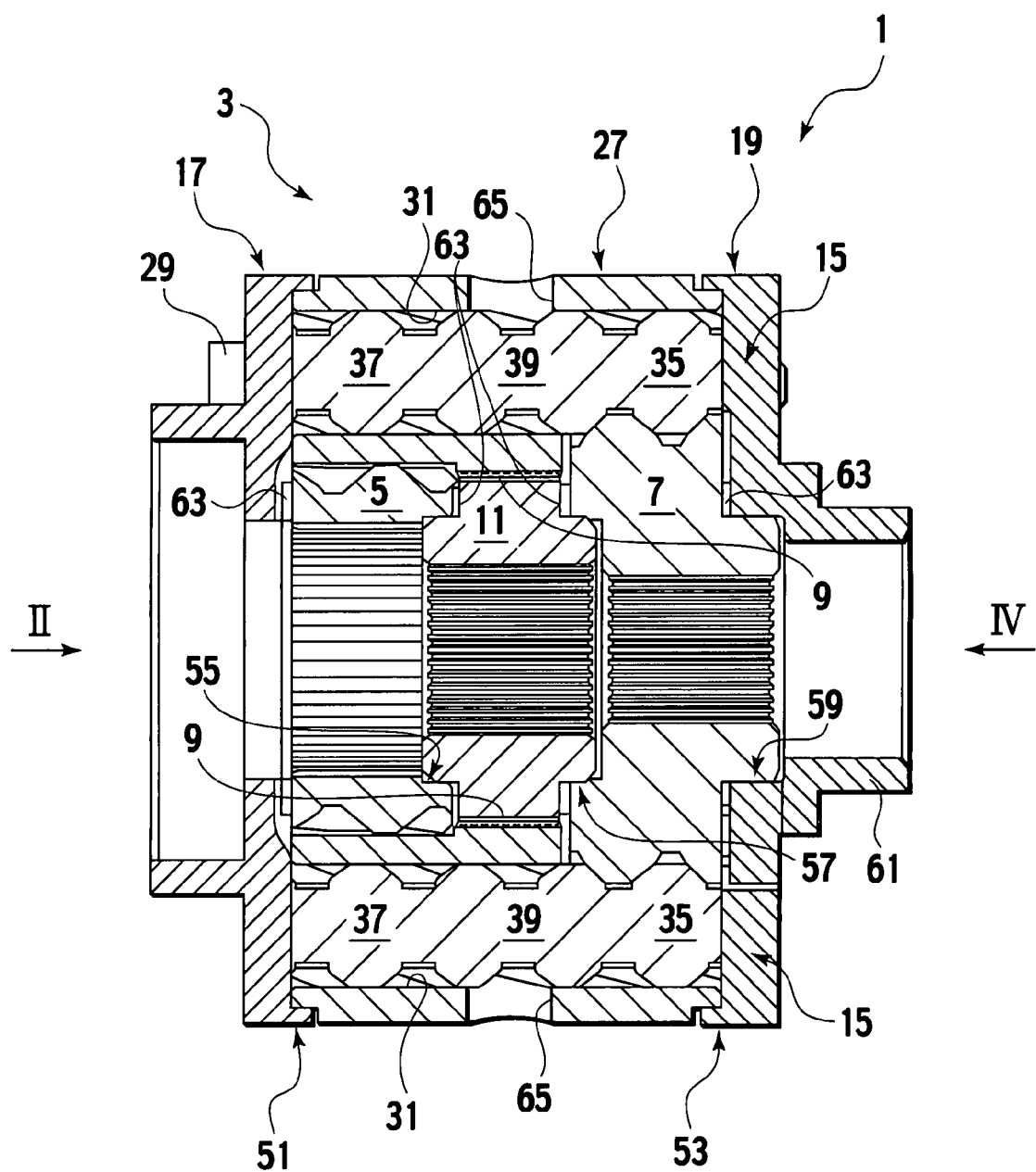
FIG. 1 is a cross sectional view of a differential device according to a first embodiment of the present invention, which is taken from a line I-I of FIG. 2.

Referring to FIG. 1, the differential device 1 is provided with a case 3, an input member 11 for receiving the torque from the input shaft 21, a pair of output gears 5 and 7 for respectively outputting distributed torque to the output shafts 23 and 25, and plural (four, in this example) pairs of shorter pinions 13 and longer pinions 15 for differentially distributing the torque to the output gear 5 and 7. The input member 11 and the output gears 5 and 7 form a row along a central axis of the differential device 1 and are rotatable about the axis.

The differential case 3 is provided with a case body 27 shown in FIGS. 8 through 11. The case body 27 defines a central bore at a center thereof along the axis, and plural (four, in this example) pairs of longer housing bores 31 and shorter housing bores 33 in parallel with the central bore. The case body 27 further defines plural (four, in the example) through holes 47 to which bolts 29 are inserted.

Figure 2:
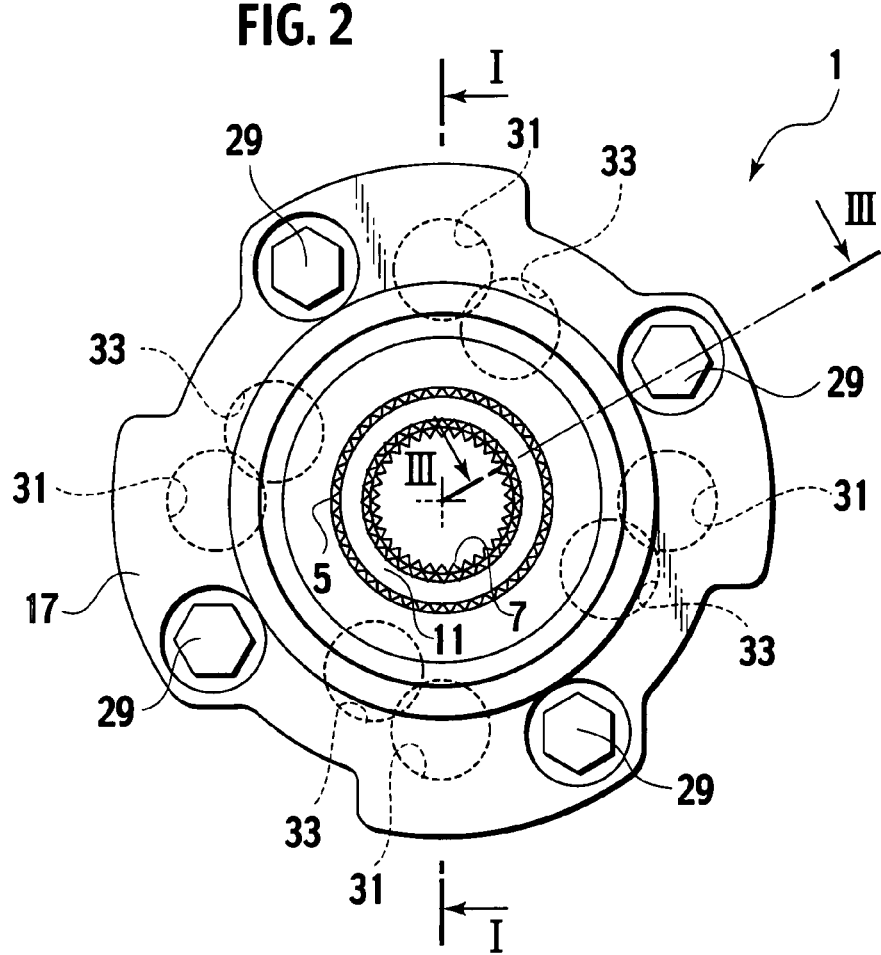
FIG. 2 is a side view of the differential device shown from an arrow II of FIG. 1.

Referring to FIG. 2, the central bore houses the output gears 5 and 7 and the input member 11 along the axis. The central bore has an engaging internal periphery 45 for engaging with the input member 11. The engaging internal periphery 45 forms a cylindrical hollow around the axis and is totally splined all around the hollow. Further referring to FIGS. 1 and 3, as adjacent to the engaging internal periphery 45, the central bore includes a housing portion 41 for rotatably housing the output gear 5 and another housing portion 43 for rotatably housing the output gear 7. The housing portion 43 is larger in diameter than the housing portion 41.

Figure 3:
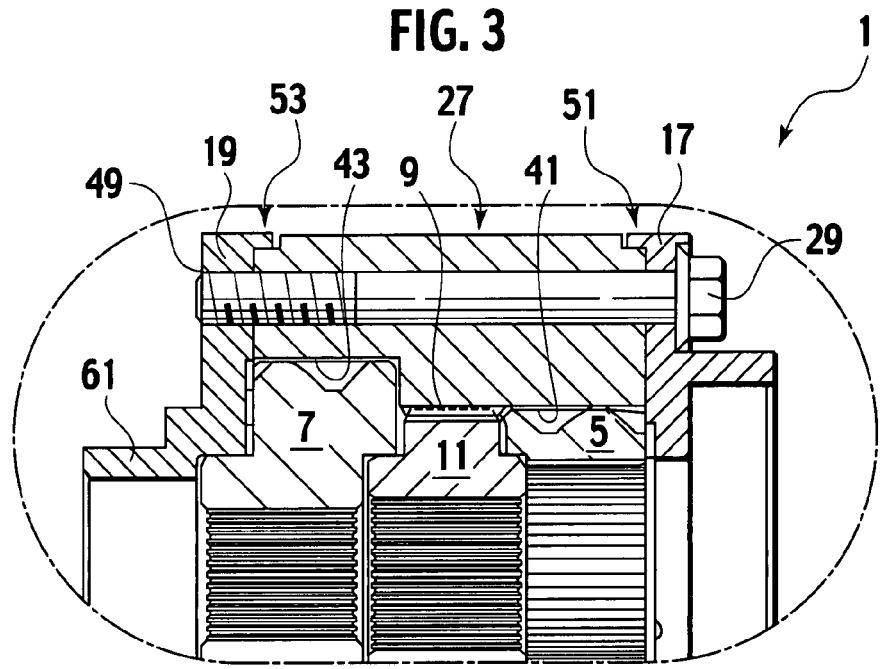
FIG. 3 is a partial sectional view of the differential device, which is taken from a line III-III of FIG. 2.
Figure 5:
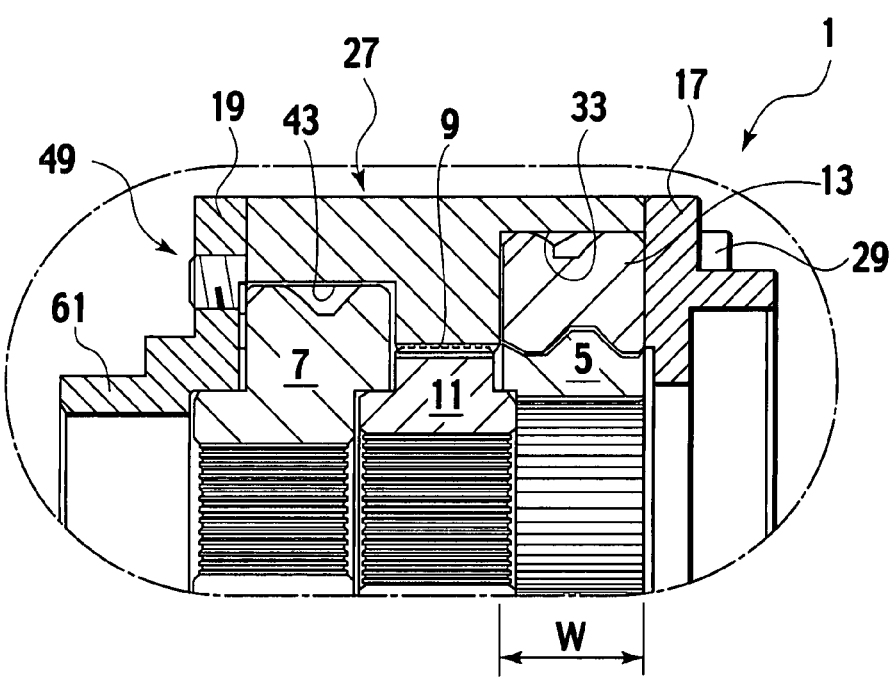
FIG. 5 is a partial sectional view of the differential device, which is taken from a line V-V of FIG. 4.

Referring to FIG. 2, the longer housing bores 31 respectively house the longer pinions 15 and the shorter housing bores 33 respectively house the shorter pinions 13. The housing bores 31 and 33 extend in parallel with the axis of the case 3. Each paired housing bores 31 and 33 communicate with each other so as to allow engagement between the pinion 15 and the pinion 13 housed therein. The shorter housing bores 33 are arranged at even intervals on a circle around the axis. The longer housing bores 31 are also arranged at even intervals on another circle slightly larger than the circle on which the shorter housing bores 33 are arranged. The longer housing bores 31 extend from the front end to the rear end of the case body 27. Referring to FIGS. 1, 3 and 5, near the rear end, the longer housing bores 31 communicate with the housing portion 43 so as to allow engagement between the output gear 7 and the longer pinions 15. The shorter housing bores 33 extend from the front end of the case body 27 toward the rear end but is short of the engaging internal periphery 45. The shorter housing bores 33 communicate with the housing portion 41 so as to allow engagement between the output gear 5 and the shorter pinions 13.

As the shorter housing bores 33 is short of the engaging internal periphery 45, the housing bores 33 do not have overlaps with the engaging internal periphery 45. As the longer housing bores 31 are spaced from the central bore, the longer housing bores 31 are not obstructive to formation of the engaging internal periphery 45. Therefore, the engaging internal periphery 45 is not required to be cut off by the housing bores 31 and 33 and hence totally contributes to engagement with the input member 11.

Figure 4:
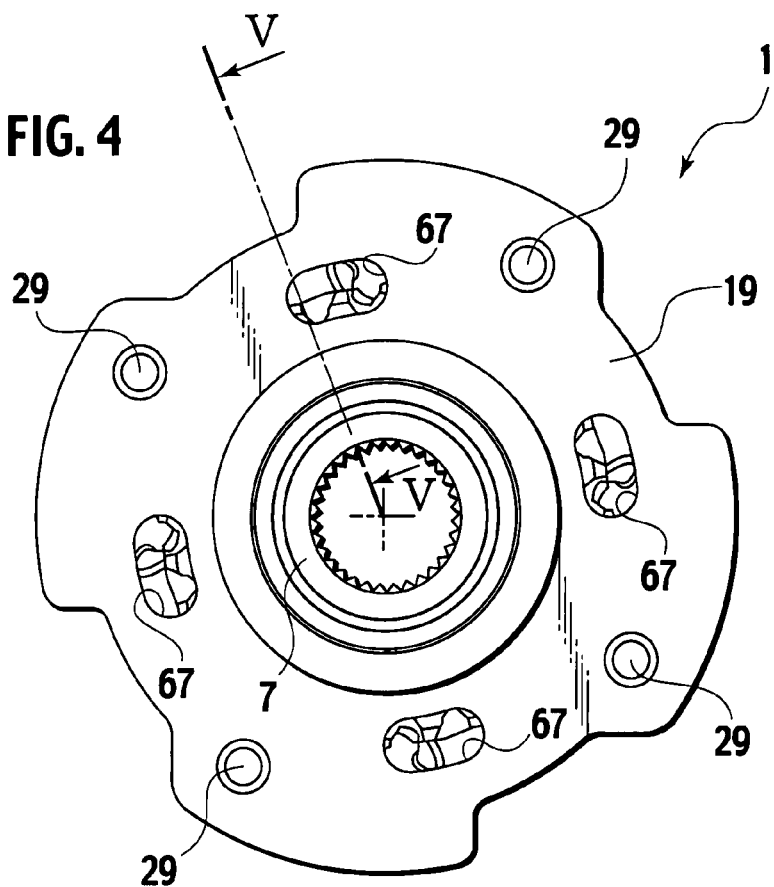
FIG. 4 is a side view of the differential device shown from an arrow IV of FIG. 1.

The case body 27 further defines openings 65 at side peripheries and the rear cover 19 defines openings 67 as shown in FIG. 4. These openings 65 and 67 allow inflow and outflow of transfer oil. The oil lubricates various locations where gears mesh with each other and members slide on other members.

The differential case 3 is further provided with a front cover 17 and a rear cover 19 for covering the front end and the rear end of the case body 27, respectively. The front cover 17 and the rear cover 19 respectively fit on the case body 27 at fitting portions 51 and 53. The input shaft 21 and the output shaft 23 coaxial therewith penetrate the front cover 17 to respectively link with the input member 11 and the output gear 5. The output shaft 25 penetrates the rear cover 19 to link with the output gear 7. The rear cover 19 defines plural screw holes 49 by which the bolts 29 are fixed. The rear cover 19 is provided with a boss portion 61 for being rotatably supported by the transfer case 141 with intervening bearings.

Figure 6:
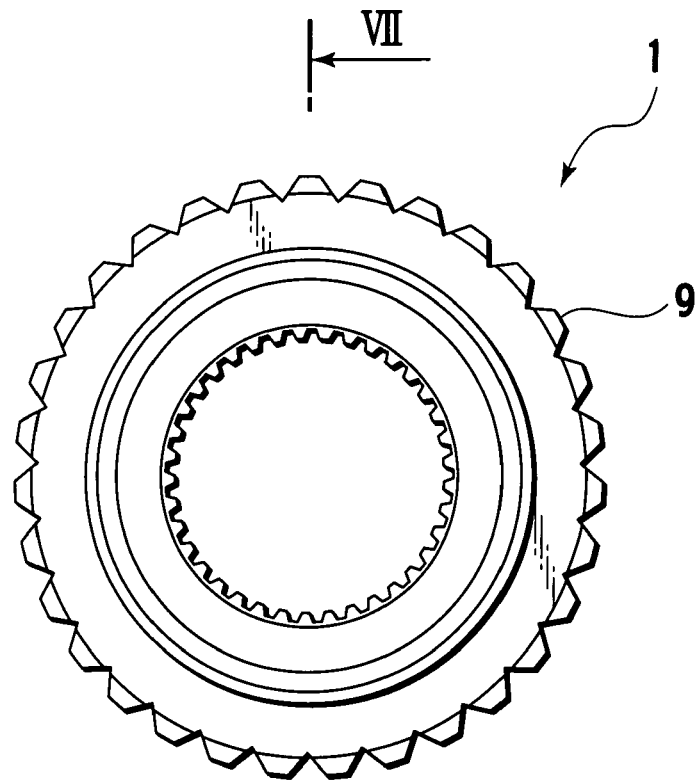
FIG. 6 is a side view of an input member of the differential device for receiving torque.
Figure 6:
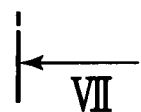
Figure 7:
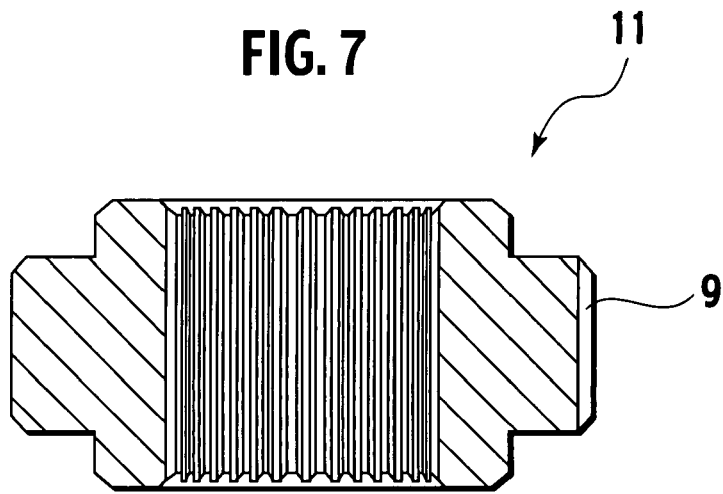
FIG. 7 is a cross sectional view of the input member.
Figure 8:
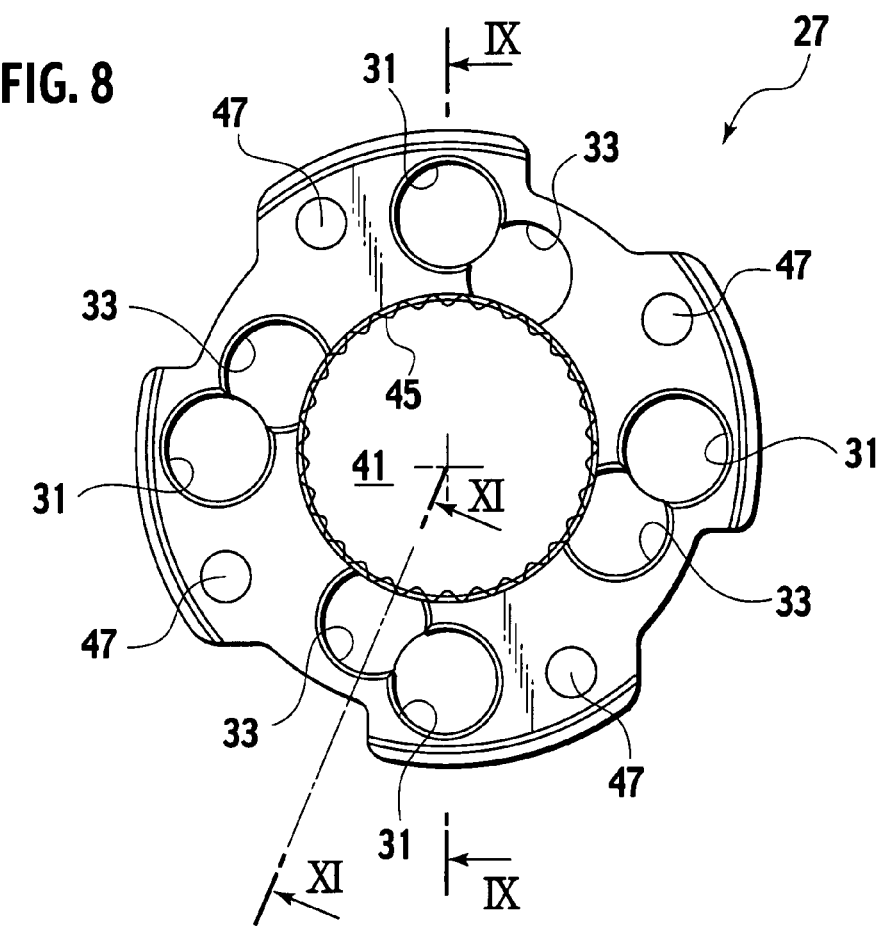
FIG. 8 is a side view of a case body of the differential device, which is taken from an arrow VIII of FIG. 9.
Figure 9:
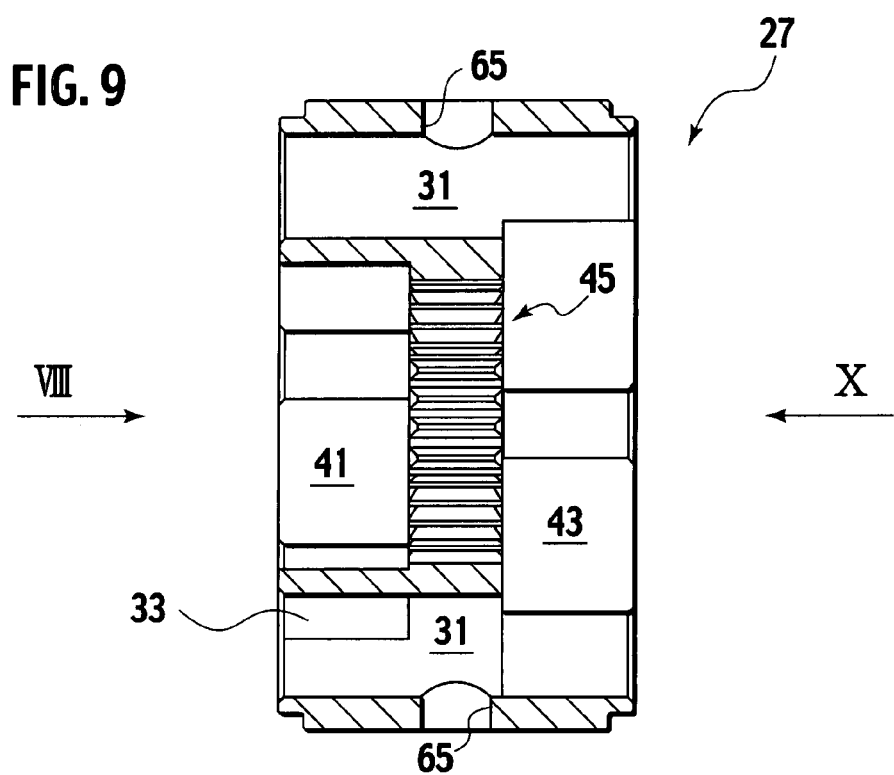
FIG. 9 is a cross sectional view of the case body, which is taken from a line IX-IX of FIG. 8.
Figure 10:
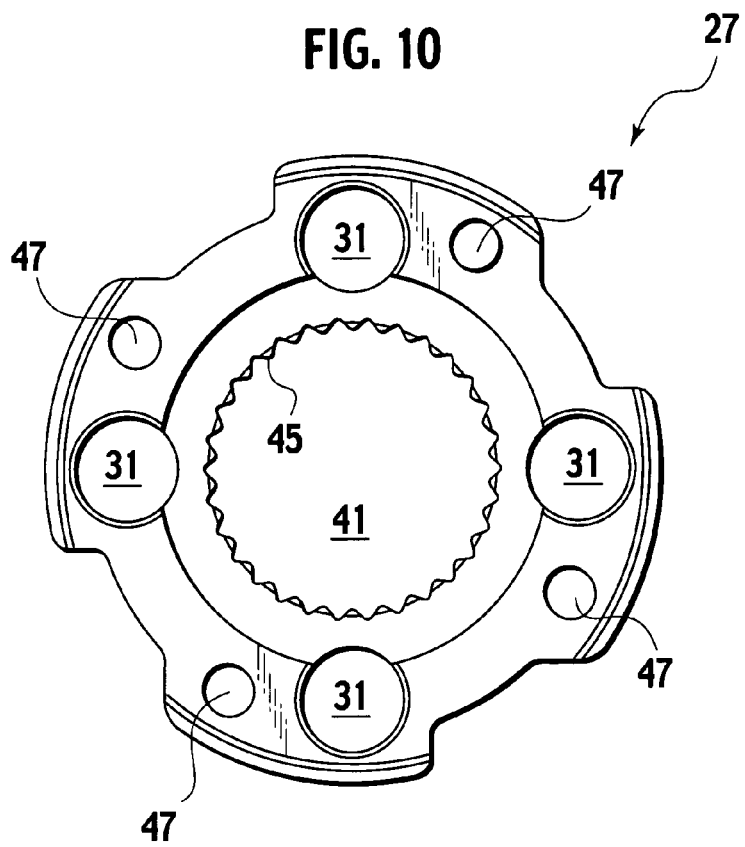
FIG. 10 is a side view of the case body, which is taken from an arrow X of FIG. 9.
Figure 11:
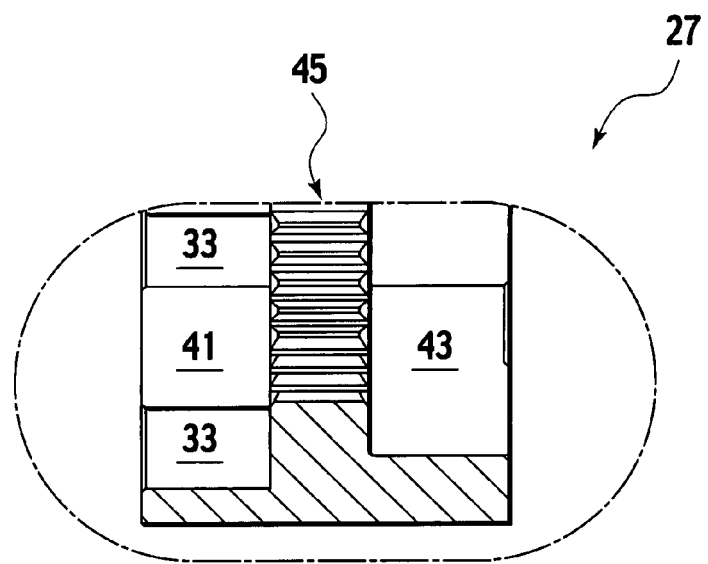
FIG. 11 is a partial sectional view of the case body, which is taken from a line XI-XI of FIG. 8.
Figure 12:
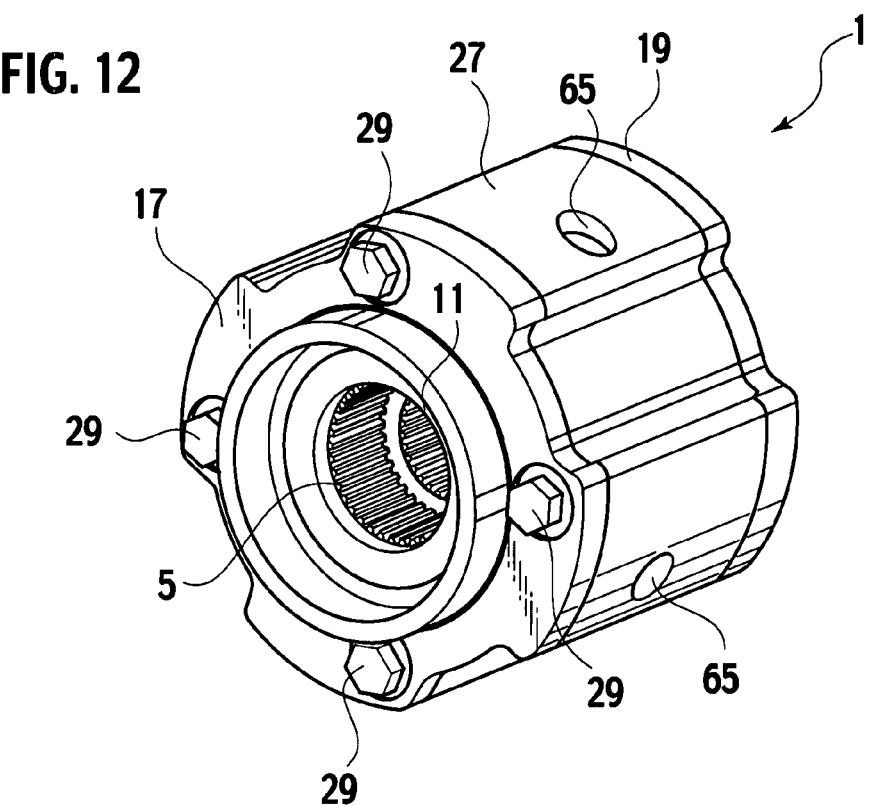
FIG. 12 is an elevational perspective view of the differential device.
Figure 13:
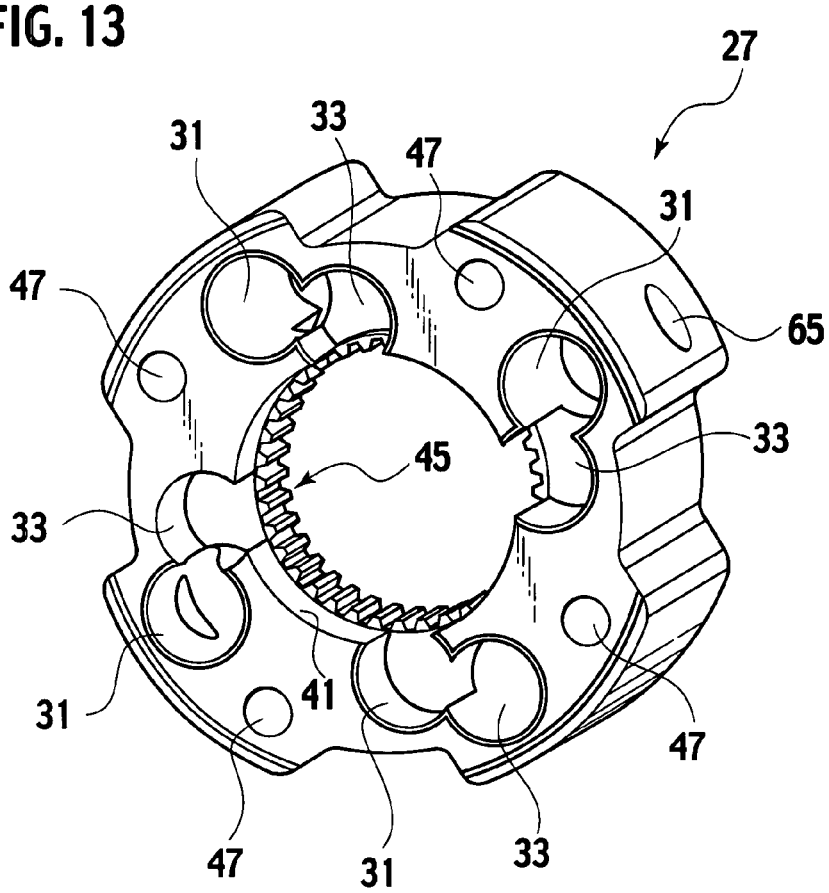
FIG. 13 is an elevational perspective view of the case body.

Referring to FIGS. 6 and 7, the input member 11 has a splined outer periphery 9 for engaging with the engaging internal periphery 45 of the case body 27. An inner periphery of the input member 11 is also splined so as to engage with and receive torque from the input shaft 21. Referring again to FIGS. 1 through 5, the input member 11 is inserted in the central bore and disposed substantially at the center of the case body 27, where the input member 11 is made engaged with the case body 27.

The output gear 5 and 7 also respectively include splined inner peripheries so as to link with the output shafts 23 and 25. The output gear 7 is made relatively larger so as to mesh with the longer pinions 15 disposed apart from the central bore. The output gears 5 and 7 are also inserted in the central bore and disposed in the housing portions 41 and 43 of the central bore, respectively. The output gears 5 and 7 are made rotatable in the housing portions 41 and 43.

The output gear 5 has a support portion 55 for rotatably supporting the input member 11, which fits on a shoulder of the input member 11. Similarly, the output gear 7 also has a support portion 57. The rear cover 19 has a support portion 59 fitting on a shoulder of the output gear 7. Thrust washers 63 are interposed respectively among the output gears 5 and 7, the input member 11 and the covers 17 and 19 and receive thrust force acting on the input member 11 and the output gears 5 and 7. The input member 11 is thus supported from both ends by the covers 17 and 19 so as not to be displaced in the axial direction.

The shorter pinions 13 are rotatably inserted in the shorter housing bores 33 and the longer pinions 15 are rotatably inserted in the longer housing bores 31. The length of the shorter pinions 13 is substantially limited within a range of a teeth width W of the output gear 5 as shown in FIG. 5. Each pinion 13 is made to mesh with both each pinion 15 and the output gear 7. Each pinion 15 extends from the rear end to the front end of the case body 27. A proximal portion 35 of each pinion 15 is made to mesh with the output gear 5, and a distal portion 37 thereof beyond a mid portion 39 is made to mesh with each pinion 13. As the pinions 13 and 15 are made rotated along with the differential case 3, the torque input to the input member 11 is transmitted to the output gears 5 and 7 via the pinions 13 and 15 meshing therewith. Further, as the output gear 5 and 7 are coupled with each other by the pairs of the pinions 13 and 15, differential in rotation speeds between the output gears 5 and 7 is allowed.

All of the gears 5 and 7 and the pinions 13 and 15 are profiled to have helical gear teeth meshing with each other. During transmission of the torque, the pinions 13 and 15 respectively receive thrust forces generated by the meshing helical gear teeth and centrifugal forces generated by rotation of the differential case 3. These forces urge the pinions 13 and 15 toward wall faces of the cover 17 and 19 and the housing bores 31 and 33 and hence lead to frictional resistance to rotation of the pinions 13 and 15. As the frictional resistance limits differential motion, the differential device 1 functions as a torque-sensitive limited slip differential, which assures all-wheel traction when the automobile requires relatively large torque, for example at a time of start or acceleration.

As the shorter pinions 13 do not have overlaps with the splined outer periphery 9 of the input member 11 and the longer pinions 15 are disposed apart in the radial direction from the splined outer periphery 9, the engagement of the splined outer periphery 9 with the engaging internal periphery 45 is not structurally or dimensionally limited. The whole length of the splined outer periphery 9 can contribute to engagement with the differential case 3 and is therefore enabled to transmit relatively large torque.

The differential device 1 in accordance with the present embodiment of the present invention enables input from one end and output to both ends, one of which is coaxial to the input. By coupling the input with the engine and the outputs with front and rear axles, the differential device 1 enables differential distribution of torque generated by the engine to the front and rear axles. The differential device 1 allows differential in rotation speeds between both the outputs.

Support of the input member 11 in the axial direction is assured by the front and rear covers 17 and 19 via the interposed output gears 5 and 7 which put the input member 11 therebetween.

Helical gear teeth of the gears 5 and 7 and the pinions 13 and 15 generate thrust force which leads to torque-sensitive limitation of differential rotation.

Further, the bolts 29 may be disposed at respective spaces between respective pairs of housing bores 31 and 33 and disposed on a slightly larger circle than the circle on which the housing bores 31 are arranged, as shown in FIG. 2. Such an arrangement enables a fixation structure in which the bolts 29 can avoid the pinions 13 and 15. This leads to secure fixation. Further such an arrangement saves dead spaces and therefore the differential case 3 is prevented from being largescale.

Figure 15:
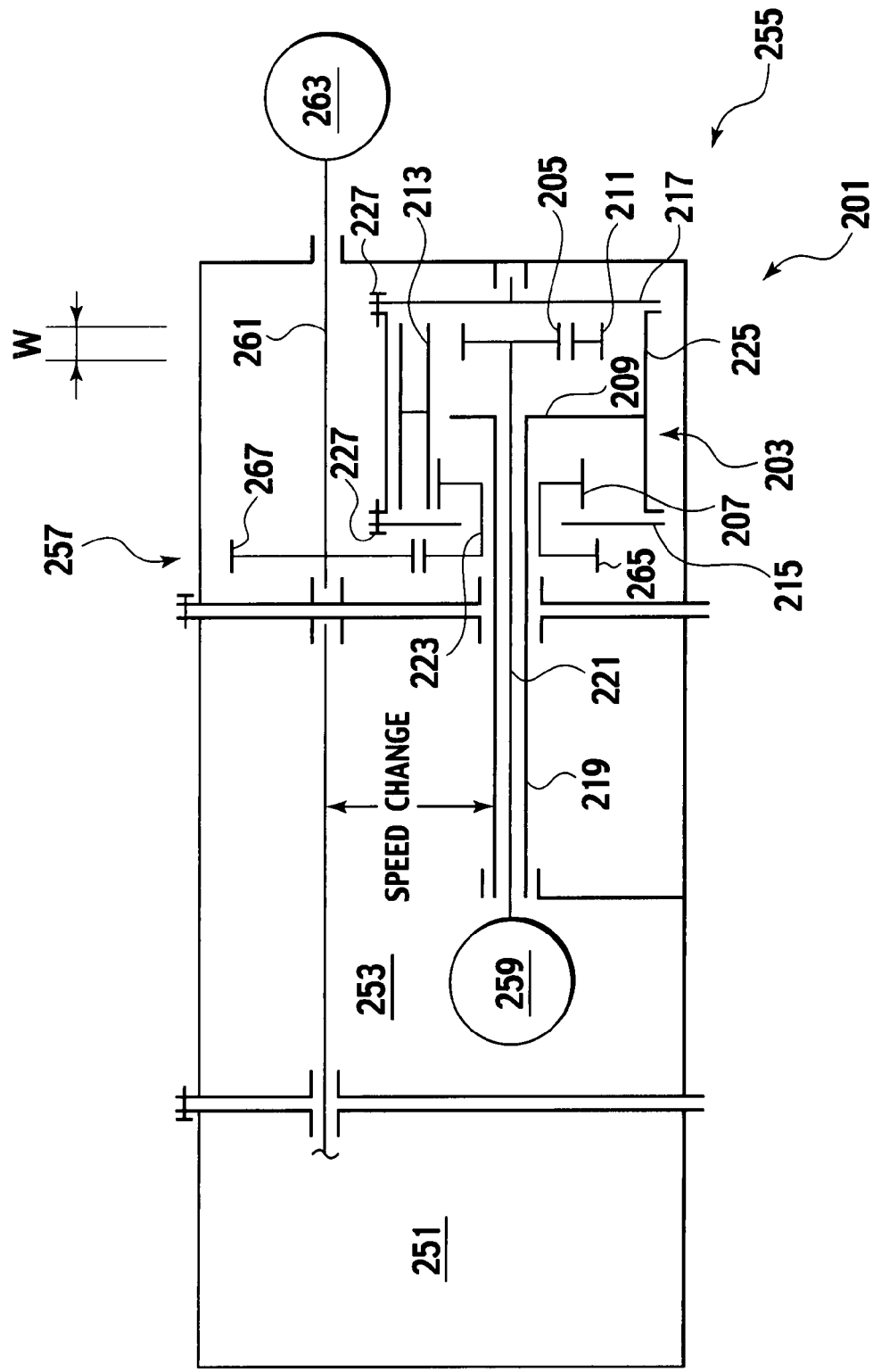
FIG. 15 is a schematic view of a drive train to which a differential device in accordance with a second embodiment is applied.

The aforementioned embodiment may be modified into a second embodiment as will be described hereinafter. A differential device 201 in accordance with the second embodiment of the present invention is employed as a center differential in a drive train shown in FIG. 15.

The drive train is provided with a transmission 253 for transmission of torque generated by an engine 251 to a transfer 255. The transmission 253 may include a proper gear set to change rotation speed. The transfer 255 receives the torque after the result of changing speed. The transfer 255 is coupled with a front output shaft 221 and a gear link 257. The gear link 257 includes a driving gear 265 and a follower gear 267 which meshes with the driving gear 265 and is coupled with a rear propeller shaft 261. Thereby the torque is distributed to the shafts 221 and 261. The torque distributed to the front output shaft 221 drives a front differential 259 to drive left and right front axles (not shown). The torque distributed to the rear propeller shaft 261 drives a rear differential 263 to drive left and right rear axles (not shown).

The transfer 255 is provided with a center differential, to which a differential device 201 in accordance with the second embodiment is applied. The differential device 201 receives the torque via an input shaft 219 which is coaxial with the output shaft 221.

The differential device 201 is provided with a differential case 203, an input member 209 for receiving the torque from the input shaft 219, a pair of output gears 205 and 207 fore respectively outputting distributed torque to the output shafts 221 and 223, and plural pairs of shorter pinions 211 and longer pinions 213.

The differential case 203 is provided with a case body 225 and covers 215 and 217 respectively covering front and rear ends thereof. The covers 215 and 217 are fixed by means of plural bolts 227.

As with the differential device 1 of the first embodiment, also in the differential device 201 in accordance with the second embodiment, each longer pinion 213 extends from the rear end to the front end of the case body 225 but each shorter pinion 211 extends from the rear end toward the front end but is short of the input member 209. Each longer pinion 213 meshes with both the output gear 207 and the shorter pinion 211, and each shorter pinion 211 meshes with both the output gear 205 and the longer pinion 213. As the pinions 213 and 215 are made rotated along with the differential case, the torque input to the input member 209 is transmitted to the output gears 205 and 207.

All of the gears 205 and 207 and the pinions 211 and 213 are profiled to have helical gear teeth meshing with each other. Thereby, differential in rotation speeds between the output gear 5 and 7 is allowed and also a function of a torque-sensitive limited slip differential is obtained.

As the shorter pinions 211 do not have overlaps with the input member 209 and the longer pinions 213 are spaced from the input member 209 in the radial direction, engagement all around the input member 209 can be assured.

In contrast with the differential device 1 of the first embodiment, all of the input shaft 219 and the output shafts 221 and 223 are commonly coaxially led out of the front end of the differential case 203. Therefore, input and output of the torque are commonly executed at the same (front) end.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A differential device for differentially transmitting torque from an input shaft to a pair of output shafts, the differential device comprising:
    a case rotatable about an axis;
    an input member configured to receive the torque from the input shaft, the input member being housed in the case and including an engaging outer periphery drivingly engaged with the case;
    first and second output gears configured to respectively drivingly link with the output shafts, the first and second output gears being rotatably housed in the case to form a row with the input member along the axis;
    one or more first pinions being rotatably housed in the case in parallel with the axis and meshing with the first output gear, the first pinions having no overlap with the engaging outer periphery of the input member and the second output gears; and
    one or more second pinions being rotatably housed in the case in parallel with the axis and meshing with the second output gears and the first pinions, the second pinions extending beyond the input member to reach the first pinions.

2. The differential device of claim 1, wherein the case includes a first end wall, which the input shaft and one of the output shafts penetrate, and a second end wall axially opposite to the first end wall, which another of the output shafts penetrates.

3. The differential device of claim 2, wherein the input member is interposed between and supported by the output gears supported by the first and second end walls.

4. The differential device of claim 1, wherein the case includes a case body configured to rotatably support outer peripheries of the first and second pinions, a first end wall, a second end wall axially opposite to the first end wall, and one or more bolts fixing the first and second end walls to the case body, the pinions are arranged around outer peripheries of the output gears, and the bolts are disposed in a circumferential direction of the pinions.

5. A differential device for differentially transmitting torque from an input shaft to a pair of output shafts, the differential device comprising:
    a case being rotatable about an axis and having a first end perpendicular to the axis and a second end axially opposite to the first end;
    a central bore defined in the case along the axis, the central bore including an engaging internal periphery;
    one or more first bores extending from the first end in parallel with the axis and being short of the engaging internal periphery;
    one or more second bores extending from the first end to the second end in parallel with the axis;
    an input member configured to receive the torque from the input shaft, the input member being housed in the central bore and including an engaging outer periphery engaged with the engaging inner periphery of the central bore;
    first and second output gears configured to respectively drivingly link with the output shafts, the first and second output gears being rotatably housed in the central bore to form a row with the input member along the axis;
    one or more first pinions being respectively rotatably housed in the first bores and meshing with the first output gear; and
    one or more second pinions being respectively rotatably housed in the second bores and meshing with both the first pinions and the second output gear.

6. The differential device of claim 5, wherein the case includes a first end wall to cover the first end, which the input shaft and one of the output shafts penetrate, and a second end wall to cover the second end, which another of the output shafts penetrates.

7. The differential device of claim 6, wherein the first and second end walls support the row of the first output gear, the input member and the second output gear.

8. The differential device of claim 5, wherein the case includes a case body configured to rotatably support outer peripheries of the first and second pinions, a first end wall, a second end wall axially opposite to the first end wall, and one or more bolts fixing the first and second end walls to the case body, the pinions are arranged around outer peripheries of the output gears, and the bolts are disposed in a circumferential direction of the pinions.

* * * * *